(12) United States Patent
Schultz et al.

(10) Patent No.: US 8,689,604 B2
(45) Date of Patent: Apr. 8, 2014

(54) OFFSET ERROR AUTOMATIC CALIBRATION INTEGRATED CIRCUIT

(71) Applicants: Peter S. Schultz, Gilbert, AZ (US); Sung-Jin Jo, Gilbert, AZ (US)

(72) Inventors: Peter S. Schultz, Gilbert, AZ (US); Sung-Jin Jo, Gilbert, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/671,951

(22) Filed: Nov. 8, 2012

(65) Prior Publication Data

US 2013/0061649 A1 Mar. 14, 2013

Related U.S. Application Data

(62) Division of application No. 12/709,063, filed on Feb. 19, 2010, now Pat. No. 8,321,170.

(51) Int. Cl.
*G01D 18/00* (2006.01)

(52) U.S. Cl.
USPC .............. 73/1.88; 73/1.01; 702/108; 702/87

(58) Field of Classification Search
USPC ...................... 73/1.88; 702/104, 87
See application file for complete search history.

(56) References Cited

U.S. PATENT DOCUMENTS

| 5,037,291 | A | * | 8/1991 | Clark | 431/12 |
| 6,450,005 | B1 | | 9/2002 | Bentley | |
| 7,209,013 | B2 | | 4/2007 | Norman et al. | |
| 7,392,152 | B2 | | 6/2008 | Inukai et al. | |
| 7,695,189 | B2 | | 4/2010 | Lim et al. | |
| 8,109,126 | B1 | | 2/2012 | Gibb | |
| 2006/0175636 | A1 | * | 8/2006 | Vaassen | 257/207 |

FOREIGN PATENT DOCUMENTS

WO 2008068542 A1 6/2008

OTHER PUBLICATIONS

Stum, K.< "Sensor Accuracy and Calibration Theory and Practical Application", National Conference on Building Commissioning, Apr. 19-21, 2006, pp. 1-15.
Reodique, A., "Implementing Auto-Zero for Integrated Pressure Sensors", Freescale Semiconductor Application Note, Oct. 2007, 4 pgs., Freescale Semiconductor, U.S.A.
Tuck, K., "Implementing Auto-Zero Calibration Technique for Accelerometers", Freescale Semiconductor Application Note, Mar. 2007, 5 pgs., Freescale Semiconductor, U.S.A.

* cited by examiner

*Primary Examiner* — Hezron E Williams
*Assistant Examiner* — Paul West
(74) *Attorney, Agent, or Firm* — James L. Clingan, Jr.

(57) ABSTRACT

An integrated circuit includes a transducer and transducer circuitry and additional elements useful in testing the transducer and transducer circuitry. A first power supply terminal and a second power supply terminal are for being directly connected to an external power supply terminal. A power bus is connected to the first power supply terminal. A logic function is for determining if the second power supply terminal is receiving power and if an automatic calibration test of the transducer and transducer circuitry has been run. An automatic calibration is for running an automatic calibration test on the transducer and transducer circuitry if the logic means determines that the second power supply terminal is receiving power and the automatic calibration test of the transducer and transducer circuitry has not been run.

6 Claims, 2 Drawing Sheets

OFFSET ERROR AUTOMATIC CALIBRATION INTEGRATED CIRCUIT

BACKGROUND

1. Field

This disclosure relates generally to semiconductors, and more specifically, to the calibration of integrated circuits to compensate for offset errors.

2. Related Art

Integrated circuits typically incorporate sensing devices. Examples of such sensing devices include temperature sensors and motion sensors such as accelerometers. Clearly the accuracy of such sensors is of paramount importance. There are numerous potential sources of errors which can cause a sensor to be inaccurate. Examples of fixed errors include errors in the conversion of a sensed signal to a voltage, an analog to digital (A/D) conversion of a signal, component resistances and display resolutions, just to highlight a few. Another error source is generally described as an offset error. Sources of offset error are due to device to device offset variation (trim errors and lack of resolution), mechanical stresses, for example mounting stress, temperature stress and moisture stress, and electrical changes, such as EMI or moisture changes for example. Initial offset error may be compensated by a factory calibration by the manufacturer of an integrated circuit containing a sensor. Also, an automatic zeroing of the offset errors is needed by an end-user of the integrated circuit after the integrated circuit is placed on a circuit board in a system. When an integrated circuit sensor is placed in a system the electrical environment is modified for the integrated circuit and the sensor will likely no longer be ideally calibrated. Others have permitted an integrated circuit to use a command, known as an auto-zero command, to perform a user calibration of the sensor. However, auto-zero commands require a special command function to be created for the integrated circuit and instructing an end user of what the command mechanism is, whether the mechanism occurs by user input or automatically. Automatic auto-zero mechanisms must detect the presence of one or more system conditions for auto-zeroing to occur. There can be uncertainty as to when those conditions are met and therefore to verify that a calibration was made. A need exists for a simpler mechanism to permit a user to accurately calibrate sensor products in the field.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

There is disclosed herein an integrated circuit having a transducer and associated circuitry, such as resistors or capacitors, an amplifier circuit and an analog to digital (A/D) converter. The transducer and transducer circuitry provides a sensed value that is calibrated automatically in response to two predetermined integrated circuit power supply pins of the integrated circuit receiving a supply voltage. A user of the integrated circuit does not need to use any commands place the integrated circuit into a calibration mode of operation. Also, the integrated circuit does not need to generate a calibration command to automatically enter a calibration mode of operation in response to one or more predetermined circuit conditions.

Figure 1:
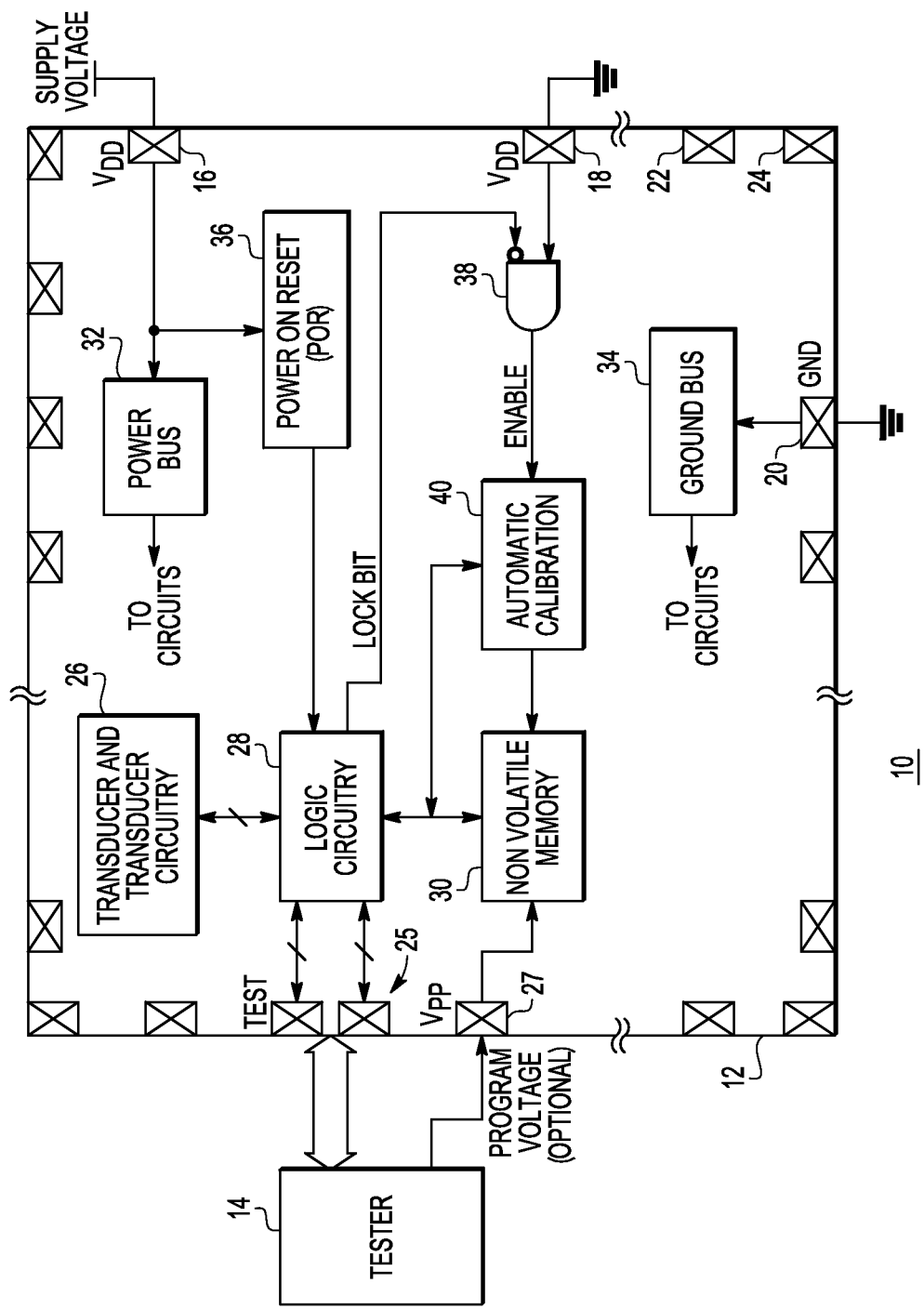
FIG. 1 illustrates in block diagram form an exemplary automatic offset calibration circuit for an integrated circuit being tested by a manufacturer in accordance with one form of the present invention.

Illustrated in FIG. 1 is an integrated circuit testing configuration 10 in which an integrated circuit 12 is coupled to an external tester 14. The integrated circuit testing configuration 10 is performed by an integrated circuit manufacturer prior to shipping the integrated circuit 12 to a customer's system. The integrated circuit 12 has a plurality of integrated circuit pins or terminals, such as terminal 16 and terminal 18 which each are power supply terminals. Other terminals, such as terminals 22 and 24 are functionally unrelated to the discussion but extend along each side of the integrated circuit 12. Two or more additional integrated circuit terminals, terminals 25 are test terminals that are bidirectionally connected to the external tester 14 via a test bus. Any number of integrated circuit terminals may be implemented in integrated circuit 12. The size and spacing of the integrated circuit terminals are not necessarily drawn to scale and are enlarged for purposes of explanation.

A transducer and transducer circuitry 26 generally has a sensor, a plurality of resistors and/or capacitors for developing a sensing voltage, an amplifier and an analog-to-digital converter which are not shown in detail. The type of sensor may be any of a variety of sensors for sensing pressure, motion, temperature or fluid level, for example. Sensors which measure or sense other parameters may be used. Multiple inputs\outputs (I/Os) of the transducer and transducer circuitry 26 are coupled to respective inputs/outputs (I/Os) of the logic circuitry 28. A test input/output terminal of the logic circuitry 28 is connected to the test terminals 25. The logic circuitry 28 has an input/output terminal coupled to an input/output terminal of a nonvolatile memory 30 and to an input/output terminal of an automatic calibration circuit 40. In one form the external tester 14 has a programming output connected to a programming terminal 27 for receiving a program voltage, $V_{pp}$. The programming terminal 27 is connected to a first input of the nonvolatile memory 30. An output of the automatic calibration circuit 40 is connected to a second input of the nonvolatile memory 30. An output of the logic circuitry 28 is connected to a first or logic low input of an AND gate 38. An output of AND gate 38 is connected to an enable input of the automatic calibration circuit 40 for receiving an Enable signal. An external supply voltage is connected to the terminal 16. Terminal 16 is connected to a power bus 32 that provides power to all of the circuitry within the integrated circuit 12. For convenience of illustration the power bus 32 is illustrated as a block but the block represents various conductors which are routed within the integrated circuit 12 to provide power to the circuitry of the integrated circuit 12. An input of a Power On Reset (POR) circuit 36 is connected to the terminal 16, and an output of the Power On Reset circuit 36 is connected to an input of the logic circuitry 28. A second input of AND gate 38 is connected to the supply voltage terminal 18. The supply voltage terminal 18 is connected to the ground terminal of a supply voltage which is typically earth ground. The ground terminal of the supply voltage is also connected to the terminal 20 which is connected to a ground bus 34. The ground bus provides a ground to all of the circuitry within the integrated circuit 12. For convenience of illustration the ground bus 34 is illustrated as a block but the block represents various conductors which are routed within the integrated circuit 12 to provide ground to the remaining circuitry of the integrated circuit 12.

In operation, the integrated circuit 12 has been manufactured and been implemented with a sensor in the form of the transducer and transducer circuitry 26. Examples of exemplary transducers include a transducer such as an accelerometer which has, among others, three directional outputs commonly referred to as X, Y and Z which represent three directions which are orthogonal to each other. Before the integrated circuit 12 is placed into a functional system by being placed onto an electronic circuit board or card, a test to calibrate the accuracy of the transducer within the transducer and transducer circuitry 26 is performed. This test is commonly referred to as a factory test since it is prior to the placement of integrated circuit 12 in a system application. An external tester 14 is connected to the test terminals 25 for making the logic circuitry 28 provide a reading of the X, Y and Z data values when the integrated circuit 12 is placed in a reference condition. For an accelerometer, the reference condition may be for example when the integrated circuit 12 is at a level or horizontal position. For a three axis accelerometer that is horizontally level, the X and Y components have a desired 0 g output and the Z component has either a positive or a negative 1 g output. Therefore, the calibration operation must read these values and provide a correction value or trim code, if necessary, in order to obtain the desired values in the reference condition. Registers within the logic circuitry 28 of the integrated circuit 12 receive and store the X, Y and Z data values from the transducer and transducer circuitry 26. The external tester 14 reads the X, Y and Z data values and determines if there is an offset value associated with any of the values which make them have an incorrect value for the acceleration that the given axis is under. The offset values are also referred to as offset information. For each data value in which there is an offset, the external tester 14 provides a correction value and sends the correction value to the logic circuitry 28 for storage in a register of the logic circuitry 28. The correction value will be used by the logic circuitry 28 to automatically correct or adjust the appropriate data value when provided by the logic circuitry 28. The correction values may be stored in the nonvolatile memory 30 for subsequent use when the transducer value is read and provided by the logic circuitry 28. In response to the external tester 14 providing a program voltage to the programming terminal 27, the nonvolatile memory 30 is programmed by the external tester 14 to store the initial trim correction factors. It should be understood that the program voltage is optional and other circuit methods may be used to program the nonvolatile memory 30. For example, a charge pump (not shown) may be used to provide a sufficiently high programming voltage to the nonvolatile memory 30 to program the nonvolatile memory 30 in response to the logic circuitry 28 under control of the external tester 14 via the test terminals 25. During the test calibration performed by the external tester 14, the supply voltage terminal 18 is at ground potential which forces AND gate 38 to provide the Enable signal in an inactive condition. Therefore, the automatic calibration circuit 40 is not functioning. Thus, in the factory test described herein a calibration of the transducer and transducer circuitry 26 has been performed to autozero or force to a known correct value the reading(s) of the transducer. On power up at an implementer or customer site, the integrated circuit 12 reads the output of the transducer and transducer circuitry 26 and stores correction factors which should be added or subtracted from subsequent readings of the transducer.

Figure 2:
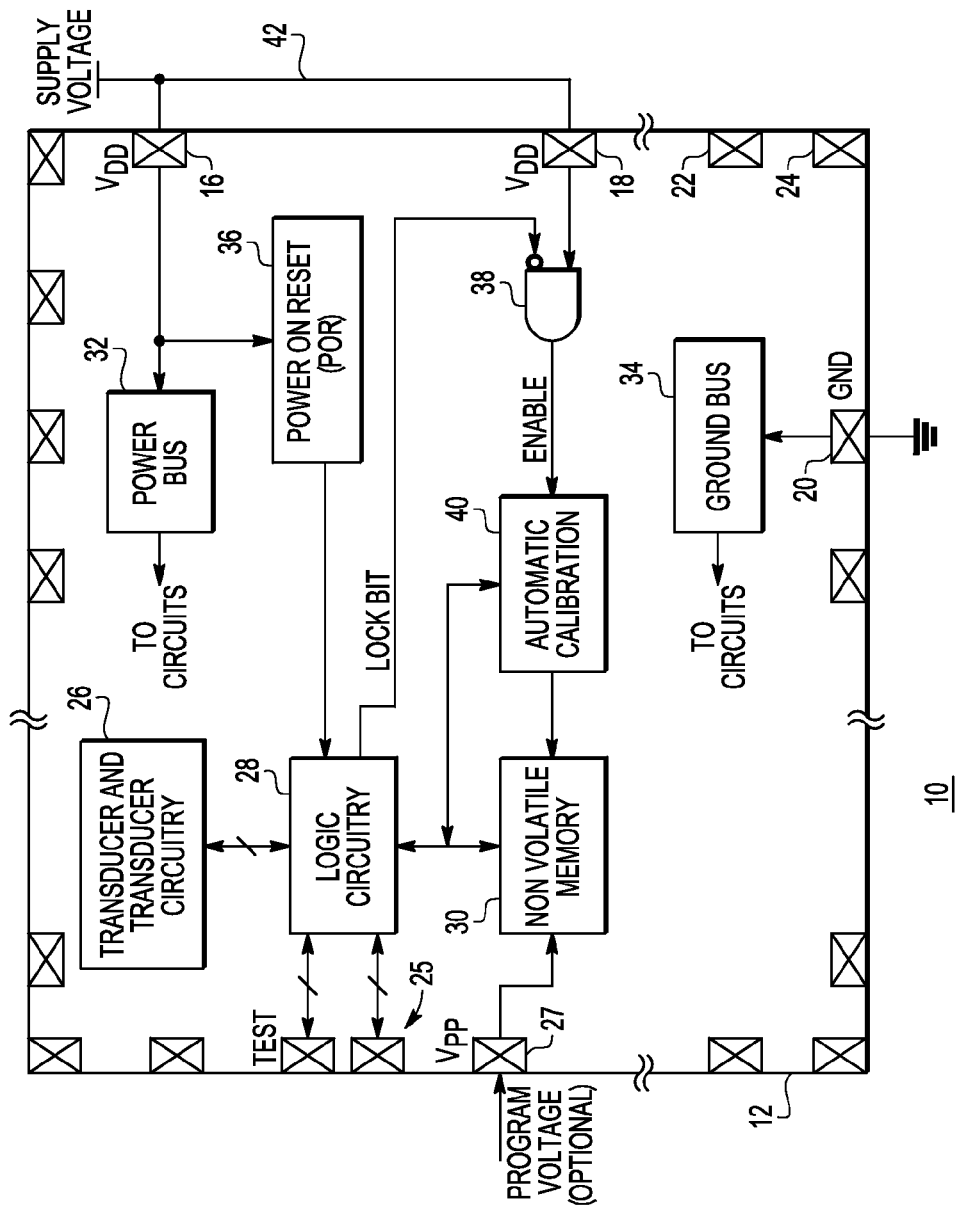
FIG. 2 illustrates in block diagram form an exemplary automatic offset calibration circuit for the integrated circuit of FIG. 1 when being tested by an end user in accordance with one form of the present invention.

Illustrated in FIG. 2 is a block diagram of the integrated circuit 12 having the transducer and transducer circuitry 26 when the integrated circuit 12 is being used in a system. For convenience of illustration, the elements of integrated circuit 12 are provided with a same reference number as used in FIG. 1. The external tester 14 has been removed from the integrated circuit 12 and the test terminals 25 are no longer used when the integrated circuit 12 is placed in an operational system. In the operational mode, both of terminals 16 and 18 are connected to the supply voltage. Thus no test commands are subsequently required to be generated and provided to the test terminals 25. The terminals 16 and 18 may be independently connected to the supply voltage or the terminals 16 and 18 are hard-wired connected or directly connected together to the supply voltage. In either implementation, for a field calibration, the terminals 16 and 18 are connected to a same polarity of a supply voltage. The terminals 16 and 18 are in one form a continuous conductor 42 directly connects terminal 16 to terminal 18.

In operation, upon initial application of the supply voltage the Power on Reset (POR) circuit 36 senses a transition in voltage value from zero to $V_{DD}$. Upon sensing the transition of the supply voltage to the value $V_{DD}$, the POR circuit 36 generates a signal (low to high, and possibly releasing from resetting state) until the supply voltage is removed and returned to a zero value. The signal that is generated by the POR circuit 36 is provided to the logic circuitry 28. The logic circuitry 28 initially provides a logic low Lock Bit to the AND gate 38. Therefore, with the initial application of the supply voltage to terminal 18, the AND gate 38 asserts an active output signal as the Enable signal. When the supply voltage is initially applied, the integrated circuit that is incorporated within a system, such as a circuit card, should be placed in a known reference condition for the transducer so that a known desired value of the transducer and transducer circuitry 26 exists. The asserted Enable signal causes the automatic calibration circuit 40 to begin a calibration of the transducer in the transducer and transducer circuitry 26. In particular, the automatic calibration circuit 40 signals the logic circuitry 28 to make data readings of the transducer data from the transducer and transducer circuitry 26. The previously stored trim codes from the factory test are retrieved from the nonvolatile memory 30 and put into registers in the logic circuitry 28 for use in determining whether or not offset error exists with the value that was provided by tester 14 at the factory and the transducer and transducer circuitry 26. The logic circuitry 28 provides the automatic calibration circuit 40 with the sensor data readings. To the extent that any of the sensor data is not at the anticipated reference value (e.g. a zero or plus/minus one value), the automatic calibration circuit 40 creates an additional correction to the trim code values to add to the original trim codes from the factory test. Such a revision is performed for each trim code when there is more than one sensor data value to calibrate. This revised trim is then provided to the nonvolatile memory 30 for storage of the revised correction. In one form, the programming voltage for the nonvolatile memory 30 is generated internally. When the automatic calibration circuit 40 completes the initial power up calibration, a "calibrate complete" signal is sent to the logic circuitry 28 by the automatic calibration circuit 40. Communication between the logic circuitry 28 and the automatic calibration circuit 40 may be bidirectional during the automatic calibration. In response the logic circuitry 28 and/or the automatic calibration circuitry 40 sends the correction factors, or trim codes, needed for offset correction to the nonvolatile memory 30 for storage and also stores or asserts the Lock Bit to a logic high or logic low (if inverted logic is used) and will maintain the Lock Bit at a logic high value from then on regardless of whether the supply voltage is later removed. In response to the Lock Bit having a logic high value, the Enable signal at the output of AND gate 38 is deasserted. The Enable signal will remain unasserted and the lock bit will not be asserted by the logic circuitry 28 again. Thus an automatic re-calibrate of the sensor provided by the transducer and transducer circuitry 26 has occurred without any command signal or user involvement other than supplying the power supply voltage to the designated terminals. In one form, after the automatic test to calibrate the transducer circuitry of the transducer and transducer circuit 26 has been run, a signal is provided external to integrated circuit 12 by logic circuitry 28 to test terminals 25 to indicate that the automatic test has been run. Test terminals 25 are multiple conductors. For example, the multiple conductors may represent a Serial Data signal (SDA) of the I²C bus protocol or the SDO (Serial Data Out) terminal of the SPI (Serial Peripheral Interface) bus protocol. In the event an implementer or user wants confirmation that the automatic test for calibration was run, reading of the test terminals 25 by an external I²C or SPI bus may be made for confirmation.

There is herein provided a calibration method which does not require a user or implementer of an integrated circuit to know or take any special steps in order for the integrated circuit to be automatically calibrated upon the first application of power other than to be told to initially power the integrated circuit in a known reference condition, such as initially powering up on a horizontal surface. A purchaser of the integrated circuit who incorporates the integrated circuit into a proprietary system does not need to generate a special calibration command or perform a special operating sequence to obtain a field calibration of a sensor that is contained in the integrated circuit. The calibration method discussed herein provides a seller of an integrated circuit with a valuable feature in the eyes of his customer to enable the customer to be confident that a field calibration of a sensor within the integrated circuit is performed without any action other than initially applying power to one or more specified power supply pins or terminals (for at least a small amount of time which is needed for the integrated circuit to auto calibrate the sensor) in a known physical position or environment, depending upon the type of sensor that is implemented. The power supply pin of the integrated circuit controls when a sensor calibration operation is conducted and thus the sensor calibration is unobtrusive to a customer of the integrated circuit manufacturer and particularly attractive for a high volume, low cost, consumer device retail market.

Another form of the automatic calibration circuit involves the internal connection of terminal 18 to $V_{DD}$ via a resistor (not shown) connected to $V_{DD}$ by the power bus 32. In this form the terminal 18 is left unconnected by the integrated circuit manufacturer's customer and the supply voltage is only connected to terminal 16. At a manufacturer's facility, during an initial sensor calibration the terminal 18 is directly connected to ground. The ground overrides the logic high voltage that would otherwise be connected to the second input (the active high input) of the AND gate 38 and present a logic low to the second input of the AND gate 38. A logic low at the second input of AND gate 38 ensures that AND gate 38 does not assert the ENABLE signal in an active state to the automatic calibration circuit 40. In this form, when a customer connects a supply voltage to terminal 16 and leaves terminal 18 unconnected or floating, the pull-up resistor to $V_{DD}$ that is connected to the second input of AND gate 38 places an active logic value on the second input of the AND gate 38. Additionally, the low state of the Lock Bit causes the AND gate 38 to assert the ENABLE signal and begin an automatic calibration via the automatic calibration circuit 40 as described above. Thus, in the eyes of the customer of the integrated circuit, a field calibration of the sensor is performed again without any action other than initially applying power to terminal 16 with the integrated circuit in a known physical position or environment. It should be understood that in all embodiments, there may be one or more other terminals of the integrated circuit which also are power supply pins for supplying power to other portions of the integrated circuit which have not been illustrated and which are unrelated to an automatic calibration of a sensor implemented within the integrated circuit.

By now it should be appreciated that there has been provided an automatic offset calibration circuit for a sensor in an integrated circuit which does not require an implementer of the integrated circuit to use a command to calibrate the sensor. The integrated circuit performs a field calibration upon the first powering of the integrated circuit by providing a predetermined power pin that receives power in addition to at least one other power pin. Since the initial offset reading of a sensor may differ once the sensor integrated circuit has been placed in a system (i.e. mounted on a circuit board with other devices), the factory calibration may be inaccurate. Offsets in the sensor may result in the field from errors associated with the factory trim equipment, property changes of the integrated circuit, transducer, and or the entire device package. This can be an effect of singulation, bake, packaging for shipment, board mount, time and other factors. The method and circuitry provided herein functions to easily implement a field calibration of a sensor in an integrated circuit without instructing an implementer of the integrated circuit to calibrate the integrated circuit. No commands are required to be known by the implementer in order to implement the field calibration. Sensor offsets are automatically centered upon the first powering by an implementer of the integrated circuit when in a known position. Thus the implementer only need to be instructed to place the integrated circuit in a predetermined reference condition upon a first power-up of the integrated circuit. One example of the predetermined reference condition is with the marking on the integrated circuit being face up and the integrated circuit in a flat position such as a horizontal zero or in the plane that is perpendicular to earth's 1 g of gravity and/or at a specified temperature.

There is herein provided in one form a structure that is an integrated circuit. The integrated circuit has a power bus and a transducer and transducer circuitry which forms a sensor. A first power supply terminal is coupled to the power bus and is for coupling to a power supply that is external to the integrated circuit. A second power supply terminal is for coupling to the power supply external to the integrated circuit. A logic function circuit, for being powered from the power bus, has a first input coupled to the second power supply terminal, a second input for receiving a lock bit, and an output. An automatic calibration circuit, for being powered by the power bus, has an input coupled to the output of the logic function circuit. Logic circuitry, for being powered from the power bus, is coupled to the transducer and transducer circuitry and to the automatic calibration circuit for coordinating with the automatic calibration circuit to perform a calibration test on the sensor. A non-volatile memory, for being powered from the power bus, is coupled to the automatic calibration circuit for storing calibration information including the lock bit that when asserted indicates that the calibration test on the sensor has been performed in response to the second supply terminal being coupled to the power supply external to the integrated circuit. In another form a continuous conductor provides a hardwire connection between the first power supply terminal and the second power supply terminal. In another form the continuous conductor is a metal mounted on a printed circuit board. In yet another form the first power supply terminal is immediately adjacent to the second power supply terminal. In another form the logic function circuit provides an AND function. In yet another form the sensor calibration information comprises offset information. In yet another form the first power supply terminal is immediately adjacent to the second power supply terminal. In yet another form the power supply is external to the integrated circuit, wherein the power supply is a positive power supply. In yet another form the power supply is external to the integrated circuit, wherein the power supply is ground. In yet another form a power on reset circuit is coupled to the first power supply terminal and the logic circuitry.

In another form there is herein provided a method of testing a transducer and transducer circuitry on an integrated circuit. A determination is made whether an automatic calibration test of the transducer and transducer circuitry has been run. If a first power supply terminal and a second power supply terminal of the integrated circuit are receiving power through being directly connected to an external power supply voltage terminal and the calibration test has been run, the automatic calibration test on the transducer and transducer circuitry is prevented from running. If the first power supply terminal is directly connected to the external power supply voltage terminal and the second power supply terminal is not directly connected to the power supply voltage terminal, the automatic calibration test is prevented from being run. If the first power supply terminal and the second power supply terminal are receiving power through being directly connected to an external power supply voltage terminal and the automatic calibration test has not been run, the automatic calibration test is run on the transducer and transducer circuitry. After running the automatic calibration test on the transducer, calibration information is stored in a non-volatile memory. In one form the calibration information is error correction data. In another form the determination is performed by reading a state of a lock bit and determining the state of the lock bit. In another form the lock bit is read from the non-volatile memory and the lock bit is written to a register in logic circuitry. In another form if the automatic test has been run, a signal is provided external to the integrated circuit indicating that the automatic test has been run.

In another form there is herein provided an integrated circuit having a transducer and transducer circuitry. A first power supply terminal of the integrated circuit is for being directly connected to an external power supply terminal. A second power supply terminal is for being directly connected to the external power supply terminal. A power bus is connected to the first power supply terminal. Logic function circuitry determines if the second power supply terminal is receiving power and if an automatic calibration test of the transducer and transducer circuitry has been run. Automatic calibration circuitry runs an automatic calibration test on the transducer and transducer circuitry if the logic function circuitry determines that the second power supply terminal is receiving power and the automatic calibration test of the transducer and transducer circuitry has not been run. In another form the integrated circuit has a non-volatile memory and logic circuitry for controlling a storing of results of the automatic calibration test in the non-volatile memory. In yet another form the logic circuitry retrieves the results from the non-volatile memory and uses the results during operation of the transducer and transducer circuitry. In yet another form the logic circuitry stores a lock bit in the nonvolatile memory after the automatic calibration test has been run. The logic function circuitry uses the lock bit in determining if the automatic calibration test has been run. In yet another form the results are error correction data.

Although the invention has been described with respect to specific conductivity types or polarity of potentials, skilled artisans appreciate that conductivity types, polarities of potentials and the internal logic states may be reversed. As an alternative, the logic function of AND gate 38 may be modified so that a ground terminal of a power supply may be used by a user of the integrated circuit at terminal 18 rather than the $V_{DD}$ power supply terminal to cause the automatic offset calibration of the sensor to be performed by the powering up of the integrated circuit. Also, any of various types of Power On Reset circuits may be used to implement the POR circuit 36. Also, various circuit implementations may be used to implement the nonvolatile memory 30. Various transducer functions may be implemented by the transducer and transducer circuitry 26. For example, a low gravity acceleration sensor may readily be incorporated as a microelectromechanical system (MEMS) device. The logic circuit implementation may be varied so that other types of logic gates other than AND gate 38 may be implemented.

The term "coupled," as used herein, is not intended to be limited to a direct coupling or a mechanical coupling. Although the invention is described herein with reference to specific embodiments, various modifications and changes can be made without departing from the scope of the present invention as set forth in the claims below. For example, various types of transistors which are used to implement the illustrated circuit functions may be implemented, such as MOS (metal oxide semiconductor), bipolar, GaAs, silicon on insulator (SOI) and others. The amount of power supply voltage reduction can be adjusted according to specific application requirements. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of testing a transducer and transducer circuitry on an integrated circuit comprising:
   determining if an automatic calibration test of the transducer and transducer circuitry has been run, the determining comprising reading a state of a lock bit;
   if a first power supply terminal and a second power supply terminal of the integrated circuit are receiving power through being directly connected to an external power supply voltage terminal and the automatic calibration test has been run, preventing further running of the automatic calibration test on the transducer and transducer circuitry;

if the first power supply terminal is directly connected to the external power supply voltage terminal and the second power supply terminal is not directly connected to the power supply voltage terminal, preventing the automatic calibration test from being run;

if the first power supply terminal and the second power supply terminal are receiving power through being directly connected to an external power supply voltage terminal and the automatic calibration test has not been run, running the automatic calibration test on the transducer and transducer circuitry; and after running the automatic calibration test on the transducer, storing calibration information in a non-volatile memory.

2. The method of claim 1, wherein the step of storing is further characterized by the calibration information comprising error correction data.

3. The method of claim 1, wherein the step of reading the lock bit further comprises reading the lock bit from the non-volatile memory and writing the lock bit to a register in logic circuitry.

4. The method of claim 1, further comprising:

if the automatic test has been run, providing a signal external to the integrated circuit indicating that the automatic test has been run.

5. An integrated circuit, comprising:

a first power supply terminal for being directly connected to an external power supply terminal;

a second power supply terminal for being directly connected to the external power supply terminal;

a power bus connected to the first power supply terminal;

logic function means for determining if the second power supply terminal is receiving power and if an automatic calibration test of a transducer and transducer circuitry has been run;

automatic calibration means for running the automatic calibration test on the transducer and the transducer circuitry if the logic function means determines that the second power supply terminal is receiving power and the automatic calibration test of the transducer and transducer circuitry has not been run; and logic circuitry means for controlling a storing of results of the automatic calibration test of the transducer and the transducer circuitry in the non-volatile memory;

wherein:

the logic circuitry means retrieves the results from the nonvolatile memory and uses the results during operation of the transducer and transducer circuitry;

the logic circuitry means stores a lock bit in the nonvolatile memory after the automatic calibration test has been run; and the logic function means uses the lock bit in determining if the automatic calibration test has been run.

6. The integrated circuit of claim 5, wherein the results comprise error correction data.

* * * * *